United States Patent
Huber et al.

(10) Patent No.: US 8,371,075 B2
(45) Date of Patent: Feb. 12, 2013

(54) SLIDING PENDULUM BEARING

(75) Inventors: Peter Huber, Penzberg (DE); Rainer Roos, Neukeferioh (DE)

(73) Assignee: Maurer Sohne Engineering GmbH & Co. KG, Munich (DE)

( * ) Notice: Subject to any disclaimer, the term of this patent is extended or adjusted under 35 U.S.C. 154(b) by 68 days.

(21) Appl. No.: 12/096,532

(22) PCT Filed: Oct. 17, 2006

(86) PCT No.: PCT/EP2006/010018
§ 371 (c)(1),
(2), (4) Date: Oct. 17, 2008

(87) PCT Pub. No.: WO2007/073788
PCT Pub. Date: Jul. 5, 2007

(65) Prior Publication Data
US 2009/0188179 A1    Jul. 30, 2009

(30) Foreign Application Priority Data

Dec. 16, 2005  (DE) .......................... 10 2005 060 375

(51) Int. Cl.
*E04H 9/02* (2006.01)
*E04B 1/98* (2006.01)

(52) U.S. Cl. ..................... 52/167.9; 52/167.1; 52/167.8; 52/741.3

(58) Field of Classification Search ................. 52/167.1, 52/167.4, 167.7, 167.8, 167.9, 741.3; 248/562, 248/636; 384/36
See application file for complete search history.

(56) References Cited

U.S. PATENT DOCUMENTS

| 3,017,209 A | * | 1/1962 | Thomas ........................ 403/130 |
| 4,320,549 A | | 3/1982 | Greb |
| 4,644,714 A | * | 2/1987 | Zayas ........................ 52/167.4 |
| 4,917,211 A | * | 4/1990 | Yamada et al. ................ 181/0.5 |
| 5,310,156 A | * | 5/1994 | Matsumura et al. .......... 248/615 |

(Continued)

FOREIGN PATENT DOCUMENTS
FR  2 538 826    7/1984
GB  1 504 568    3/1978

(Continued)

OTHER PUBLICATIONS

Engineer's Handbook, Reference Tables—Coefficient of Friction.*

(Continued)

*Primary Examiner* — Brian Glessner
*Assistant Examiner* — Jessie Fonseca
(74) *Attorney, Agent, or Firm* — Occhiuti Rohlicek & Tsao LLP (57) ABSTRACT

For uncoupling a building structure from the ground a sliding pendulum bearing is suitable for the protection of building structures in the case of movements of the ground, due to earthquakes for example, or as an alternative for conventional deformation bearings. The bearing has a first sliding face with a first concave sliding face and a sliding shoe, which is in sliding contact with the first sliding face of the first sliding plate. A low friction material of a low-friction plastic is entrapped in the sliding shoe which has elastoplastic equilibrium properties. In particular as a low friction material a ultra high molecular weight polyethylene (UHMWPE) or polytetrafluoroethylene (PTFE) is utilized. After a displacement entailed by an external force the sliding shoe returns of its own accord into a stable equilibrium position.

44 Claims, 4 Drawing Sheets

U.S. PATENT DOCUMENTS

| | | | |
|---|---|---|---|
| 5,438,807 A * | 8/1995 | Shustov | 52/167.4 |
| 5,597,239 A * | 1/1997 | Scaramuzza et al. | 384/36 |
| 5,867,951 A * | 2/1999 | Yaguchi et al. | 52/167.4 |
| 6,021,992 A * | 2/2000 | Yen et al. | 248/560 |
| 6,115,972 A * | 9/2000 | Tamez | 52/167.4 |
| 6,126,136 A * | 10/2000 | Yen et al. | 248/560 |
| 6,245,836 B1 * | 6/2001 | Nakamaru et al. | 523/428 |
| 6,688,051 B2 * | 2/2004 | Tsai | 52/167.4 |
| 6,820,380 B2 * | 11/2004 | Tsai | 52/167.4 |
| 2001/0040206 A1 * | 11/2001 | Ferencz | 248/346.11 |
| 2003/0094560 A1 * | 5/2003 | Tsai | 248/618 |
| 2004/0074162 A1 * | 4/2004 | Tsai | 52/167.5 |
| 2006/0174555 A1 * | 8/2006 | Zayas et al. | 52/167.4 |

FOREIGN PATENT DOCUMENTS

| | | |
|---|---|---|
| JP | 61-192941 | 8/1986 |
| JP | 9-310409 | 12/1997 |
| JP | 10-339052 | 12/1998 |
| JP | 11-230254 | 8/1999 |
| JP | 2000-027938 | 1/2000 |
| JP | 2001-207676 | 8/2001 |
| JP | 2003-090013 | 3/2003 |
| JP | 2003-201772 | 7/2003 |
| JP | 2003-269008 | 9/2003 |
| JP | 2004-044312 | 2/2004 |
| JP | 2004-144135 | 5/2004 |
| JP | 2005-257001 | 9/2005 |
| JP | 2005-273353 | 10/2005 |
| SU | 857357 B * | 9/1981 |

OTHER PUBLICATIONS

Beljajew, G. S. "Sliding Bearings for Ship Engineering" (Sudostrojenie 1965), pp. 15-18 (corresponds to English translation pp. 1-4).

Tschernajewski, S. A., "Sliding Bearings," (MASCHGIS 1963), pp. 18-24, (corresponds to pp. 5-9 of English translation).

* cited by examiner

SLIDING PENDULUM BEARING

CROSS REFERENCE TO RELATED APPLICATIONS

This application is the National Stage of International Application No. PCT/EP2006/010018, filed on Oct. 17, 2006, which claims the benefit of German Application Serial No. 10-2005-060 375.0, filed on Dec. 16, 2005. The contents of both of the foregoing applications are hereby incorporated by reference in their entirety.

The invention relates to a bearing for the protection of buildings, said bearing being formed as a sliding pendulum bearing with a low friction material, and having a first sliding plate with a first concave sliding face and a sliding shoe in sliding contact with the first sliding face of the plate, said first sliding face of the first sliding plate having a stable equilibrium position in at least one dimension for the sliding face into which the sliding shoe returns of its own accord following a displacement caused by the action of an external force.

The possibilities of use of bearings in construction engineering are manifold. One field of application is earthquake protection. For example in bridge construction deforming bearings are employed for horizontal-elastic support. Seismic protection systems serve to protect against the destructive effects of quakes and are intended to uncouple the building from its foundation. Such uncoupling may also be provided to protect the building tremors of other kinds.

Since an earthquake may occur even in regions considered to be seismically active only occasionally, the systems should in principle have a long service life, be designed to be sturdy and relatively free of any need for maintenance work. The requirements furthermore include an enduring high vertical load capacity, effective uncoupling or isolation of the building with respect to horizontal movements of the subsoil and a sufficient capacity for dissipation of energy transmitted by external effects. The costs of conventional earthquake protection systems, which are at least partially able to met such requirements, are however substantial. Upgrading existing buildings with earthquake protection systems and maintenance of systems damaged by earthquakes are intricate and ocmplex.

One kind of earthquake protection system has basic isolation, i.e. the building is uncoupled from uncontrolled horizontal movements of the ground. In the case of known systems there is frequently an attempt to get maximum energy dissipation by damping and ductility effects, for example by using friction sliding pendulum bearings. It is in this manner that loads on the building itself reduced.

However the greater the dissipation in the basic isolation by way of damped oscillations, the greater is the danger that after the end of the earthquake the system will not return into the original position and accordingly its function will be impaired. The consequence is possible contingent damage by afterquakes and high costs for maintenance of the system.

One system which at least partly deals with this problem is described in the U.S. Pat. No. 5,867,951. The patent relates to a sliding pendulum bearing for seismic protection in the case of which a thermoplastic synthetic resin with a low coefficient of friction is employed as a low friction material. In the case of this bearing a return of the bearing following an earthquake is ensured into its original position. However in the case of the use of thermoplastic synthetic resin even minor inaccuracies, geometrical misshaping and defects in the bearing components, for example in the mating material, have a negative effect on the bearing properties.

If for example a sliding shoe lies on a sliding plate which n in relation to it has relatively large, thin sliding plate then the sliding shoe will apply a force at a relatively small load engagement point to the plate. As a consequence a settlement pit will be produced in the concrete underneath the sliding plate in the course of time owing to long-lasting loads. A consequence of this will be that the low friction material employed will not make regular spherical engagement with its mating face and will work its way into the steel of other mating material.

In addition to such settlement elastic deformation or poor workmanship may mean that the two faces do not have identically shaped spherical contact geometries. The two sliding faces of the two sliding materials therefore do not exactly match.

As a result such effects lead to overloading and in the long run to damage of the sliding faces, more particularly at the edges of the superposed sliding shoe. The thin material of the larger sliding face is subject to wear at such positions. Accordingly friction properties are changed. This means that the bearing will no longer function as intended in its application.

In the case of conventional deforming sliding bearings with an elastic return in one direction problems may occur, if the return does not take place exactly back to the equilibrium line. In this case aging processes may among other factors play a role.

On the basis of these circumstances one object of the present invention is to provide a bearing which has a long service life, requires little maintenance and is economic in price and which is suitable for upgrading existing buildings. A further object is to ensure the best possible return into the equilibrium position even after bearing heavy loads and after prolonged idle times.

This object is to be attained by a bearing for civil engineering purposes as set forth in claim 1.

The bearing in accordance with the invention for the protection of building structures is designed in the form of a sliding pendulum bearing with a low friction material. It possesses a first sliding plate with a first concave sliding face and a sliding shoe, which is in sliding contact with the first sliding face of the first sliding plate. The first sliding face of the first sliding plate has stable equilibrium position for the sliding shoe, into which the sliding shoe returns of its own accord following a displacement entailed by the external application of force. The low friction material comprises a synthetic resin with an elastoplastic equilibrium behavior and more particularly has a low coefficient of friction.

As an earthquake protection bearing it is possible for the bearing to compensate for external effects. As effects, which cause tremors, there are for example earthquakes and however also impacts of moved masses (for example land vehicle, airplanes and ships). Moreover explosions or heavy masses moved by explosions and impacting on a building, may engender forces acting on the building, which are to be damped by the bearing in accordance with the invention.

In the case of a sliding pendulum bearing at least one part of the kinetic energy transmitted to the building system as a whole is converted firstly into potential energy. For this purpose the building part of the bearing is shifted under the action of lateral forces acting on the foundation out of its equilibrium position, and more especially out of its sable equilibrium position, a part of the kinetic energy being converted into potential energy like a pendulum. When the maximum displacement out of the equilibrium position is reached (and accordingly the position with the maximum potential energy), the mass of the building will swing back in relation to foundation past the point of a stable equilibrium to the other side. This damped oscillation will continue until the mass, as with a pendulum, has given up its initial energy and comes to rest in the equilibrium position.

The oscillation cycle of a sliding pendulum bearing is, as with a pendulum, independent of the mass. Accordingly an optimum design of the bearing is possible for seismic protection. Furthermore the bearing, which in any case involves an advantage in costs over a conventional elastomeric bearing, is suitable for use in the case of lightweight structures and of structures with varying superimposed loads. Furthermore the low profile of sliding pendulum bearings ensures that buildings can be economically upgraded. The layout of a sliding pendulum bearing is generally simple.

Owing to the low coefficient of friction of the low friction material a sliding pendulum bearing (unlike a sliding pendulum bearing of the prior art) is produced. The lower the coefficient of friction of a sliding pendulum bearing, the more accurately the sliding shoe may return into its equilibrium position, this being with a reduced dissipation of energy. In the case of a high coefficient of friction on the contrary it is probable that the sliding shoe, after the termination of the pendulum displacement, will not return to a centered position of the bearing (owing to the extremely low slopes adjacent to the equilibrium position). In the case of there being a further tremor, there is the problem that in some cases the size, and more particularly the diameter, of the bearing will no longer be sufficient to cope with the acting forces. Unlike conventional sliding bearings, in the case of which the principal design feature is satisfactory dissipation, in the case of the present invention the coefficients of friction are minimized in order to ensure the return of the system into its stable initial position so that the bearing is ready for operation even without warning in the case of an aftershock.

Owing to the selection of a low friction material having elastoplastic equilibrium behavior further advantages are produced. Owing to the softness and adaptability of the material deficiencies in accuracy can be compensated for. Thus in the case of an elastoplastic behavior departures from geometrical intended design data, for example from a design radius of curvature, of the sliding plate are compensated for. It is in this manner that it is more readily possible to keep to dimensional tolerances during the production and maintenance of the bearing. Furthermore defects, for example in the surface structure of the sliding face, which may be entailed both in manufacture and also by the action of external effects in the long run, can be compensated for. Thus it is possible to prevent local deformation and tolerances in the radius of curvature of the sliding face having an undesired effect on the bearing's properties.

The settlement described in connection with the prior art, which is produced owing to the smaller engagement face of the sliding shoe on the relatively large thin sliding plate, may be compensated for by the elastoplastic material. Compensation is so ensured that the low friction material arranged on the contact face of the sliding shoe possesses sufficient deformabilty to ensure that rigid edges of the support material are not forced into the mating face as would be the case with a hard low friction material. Engagement at the edges of the low friction material on the sliding plate entailing a substantial modification in the frictional and wear properties, is avoided and accordingly relatively unhindered or free sliding is permitted in case of operation.

In addition to settlement dents mismatch in the two engaging spherical faces (namely one the contact face of the low friction material of the sliding shoe and on the other hand the sliding face of the sliding plate) and furthermore elastic deformation in, for example, the sliding plate, are compensated for by the low friction material with elastoplastic properties allowing compensation. Thus effects causing the sliding faces of the two low friction materials to no longer correspond to each other, are compensated for. The low friction material in accordance with the invention having elastoplastic properties thus ensures that under load the low friction material makes true spherical engagement with the sliding face.

The elastoplastic compensating behavior of the low friction material may for example compensate for mismatch of 0.5 mm, 1 mm or even 2 mm (related to the depth of settlement in the sliding plate). I. e. departures of 0.5 mm, preferably of 1 mm and more particularly of 2 mm, from the design plane of the design sliding face can be compensated for by the elastic properties of the material.

Furthermore the bedding behavior of low friction materials with an elastoplastic equilibrium behavior is superior to that of conventional rigid low friction materials. Owing to the yielding nature of the material deformation of the sliding plate (for example settlement dents) are leveled off. The curvature of a sliding plate can be optimally set without having to consider deformation under the action of a load. The design of the bearing is accordingly generally facilitated.

An elastoplastic compensation behavior of the low friction material means in this context that the low friction material only flows to a limited extent. The low friction material should admittedly flow under load of the bearing into the sliding interface between the bearing components, between which it is arranged. Such flow does not go past the point at which contact between the two bearing components is likely to occur.

As a rule the low friction material is entrapped in the bearing component (i. e. placed in a recess) which has the smaller contact face of the bearing components which slide on each other. The low friction material placed in the recess stands proud of the recess edge by an amount which sets the distance from the adjacent bearing component and accordingly the width of the bearing interface. In the case of entrapped low friction material too in accordance with the invention with elastoplastic properties the latter will flow in the loaded bearing to some extent in the bearing interface. Such flow is however just sufficient prior to the placement of one bearing component on the other one to ensure that there is no contact between the two components.

One advantage is that the sliding pendulum bearing in accordance with the invention may be utilized as an alternative to conventional plain bearings capable of deformation.

The low friction material will more particularly be arranged in the sliding planes on at least one of the smaller sliding faces of the sliding shoe and one sliding face, in contact with the sliding shoe, of the sliding plate. The low friction material with elastoplastic compensatory properties is softer or, respectively, more yieldable than the mating material provided as a sliding face for the low friction material. In order to avoid seizure at or damage to the edges of the softer material the smaller of the two faces is to be covered with the softer material.

The low friction material will preferably include ultra high molecular weight polyethylene (UHMWPE), and in particular it will consist essentially of ultra high molecular weight polyethylene (UHMWPE).

UHMWPE is a low friction material with elastoplastic compensatory properties, as is required in accordance with the invention. The sliding body may for example be manufactured using sintered thermoplastic low friction material. By modification of the material or by changes in the sliding system the friction may be systematically set. Thus UHM- WPE may be mixed with lubricants, at least adjacent to the surface, to systematically set the coefficient of friction, which takes into account both the requirements as regards low friction and also the dissipation properties. Moreover, UHMWPE as a low friction material exhibits the positive property that the set coefficient of friction remains stable even at low temperatures to a high degree. Further advantages are the low aging rate of UHMWPE materials. Furthermore there is the low wear rate so that the bearing will remain serviceable for several earthquakes.

Ultra high molecular weight polyethylene (UHMWPE) exhibits sliding properties which allow an effective and complete return or resetting into the initial position following an earthquake. The functionality of the bearing is accordingly ensured even after a quake. Furthermore displacement of the building in relation to its foundation is prevented. Following the earthquake the bearing may return to its design position. Drift out of the zero position in the course of an earthquake is avoided.

Owing to the entrapment related limited flow of the ultra high molecular weight polyethylene (UHMWPE) flow of the low friction material through the sliding interface is essentially prevented even in the case of large loads.

Ultra high molecular weight polyethylene (UHMWPE) may be employed in a pure form, as a homogenous mixture with further materials or in conjunction as a heterogeneous material serving as a low friction material.

Ultra high molecular weight polyethylene (UHMWPE) as a low friction bearing material with the above mentioned properties renders possible simple calculation, dimensioning and design of the bearing in contrast to bearings described in the prior art, more particularly in the case of seismic protection systems.

As an alternative the low friction material preferably includes PTFE (polytetrafluorethylene) and more particularly it consists substantially of PTFE (polytetrafluorethylene).

Furthermore PTFE is one of the materials with elastoplastic properties, which in accordance with the invention may be utilized as a low friction material in bearings.

In a particularly preferred embodiment the low friction material includes additional component, and in particular lubricant components. Owing to the embedding of such components in the low friction material it is possible to systematically set the coefficient of friction. More particularly the return behavior of the sliding pendulum bearing may be optimized by a suitable selection of the treated low friction material in combination with the selected mating faces.

The invention however also contemplates an improvement in other physical properties, such as rigidity, elasticity, stability or durability by the addition of additives known to those in the art.

At least in one sliding surface of the low friction material it is possible for lubricants to be incorporated. For instance the low friction material may be a sintered body, in whose porous surface structure lubricants are placed. The material may be homogeneous, i. e. with an even distribution of different material components or may be heterogeneous, i. e. formed with varying concentrations of the individual material components.

The low friction material preferably exhibits a coefficient of friction dependent on the surface pressure of the bearing so that the product of the coefficient of friction and the surface pressure is substantially constant in a predetermined surface pressure range. From the product of the coefficient of friction and the surface pressure the frictional force (which is directed as a horizontal force substantially horizontally) of the sliding bearing may be calculated. The surface pressure in this case is equal to the vertical force acting on the bearing. The advantage of a constant horizontal force, i. e. one independent of the surface pressure, lies in the fact that independently of the weight of the building on a particular path a specific quantity of energy is dissipated. In the case of a pendulum bearing accordingly in each oscillation cycle a specific quantity of energy is removed by way of the bearing. This will for example play a role in the case of buildings or structures, which may have different loading states (for example tanks). Furthermore a previously designed bearing can be employed for different buildings with different loads. It is possible to do without any adaptation to the surface pressure acting on the bearing. In other words this renders possible the use of a standard bearing in different types of building structure.

Independently of the relative speed of motion between the bearing components of the sliding bearing the low friction material preferably will possess a substantially constant coefficient of friction. This property of the low friction material also has a particularly favorable effect in seismic protection, since the speeds, at which the building parts or, respectively, part and the foundation are shifted in relation to each other, are difficult to forecast. The independence of the coefficient of friction from the speed renders it possible to compute the design of the sliding bearing in accordance with requirements in a simple manner without having to take the effect of speed into account.

The bearing may preferably comprise a mating material with which the low friction material is in contact, the mating material comprising a metallic material with sliding layers, more particularly hard chromium, anodized aluminum or chemical nickel (nickel phosphate).

The mating material can also comprise at least one metallic component, in particular one of polished stainless steel sheet.

The metallic sheet can adjoin the sliding plate without being connected with it and more particularly may be entrapped. If the sheet metal is permanently joined to the sliding plate waves which are propagated in the sheet metal may spread out and damage or break the attachment provided here. On the other hand sheet metal which is only entrapped may freely oscillate and accordingly absorb the energy of oscillation without damage to a connection and conduct the energy to one of the bearing components. Accordingly the so-called floating bearing of the mating store is more particularly preferred.

The bearing more particularly possesses a mating material, which is in contact with the sliding material, the mating material comprising a plastic, more particularly selected from the group comprising polyamides, polyoximethylenes, polyethylene terephthalates and polybutylene terephthalates. As a rule in all cases the mechanical material will be just as hard or harder than the low friction material with its elastoplastic compensatory behavior.

The mating material preferably possesses a variable coefficient of friction between the equilibrium position and the edge of the sliding face. In particular the coefficient of friction will increase toward the edge of the sliding face. Accordingly together with an improved isolation in the central portion of the sliding face there is an improved centering of the sliding shoe. The friction increasing in an outward direction in such portions ensures better dissipation of the seismic energy by the bearing.

Figure 4:
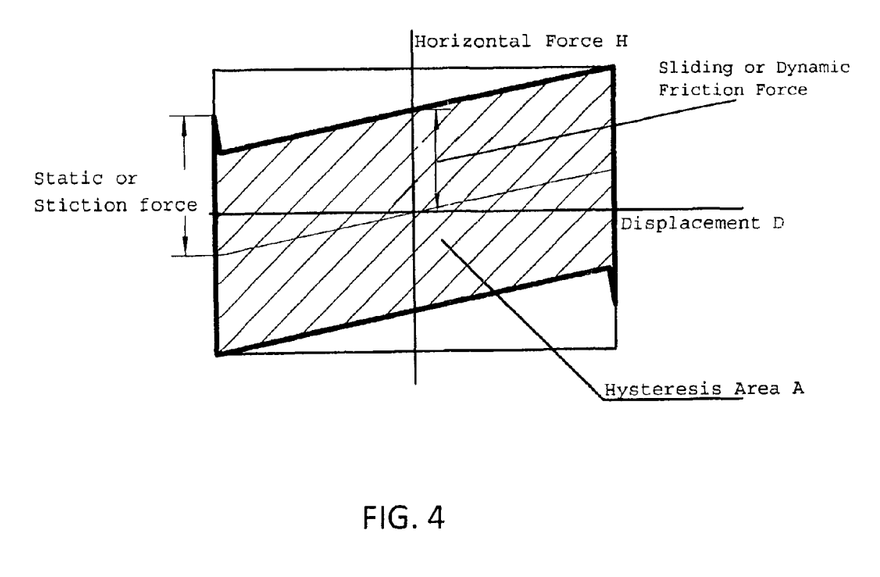
FIG. 4 illustrates the result of a displacement or deflection test.

The bearing more particularly possesses coefficients of friction of 2%. Whereas in the prior art even in the case of high temperatures coefficients of friction of 6% could hardly be gone below, in the case of the low friction material selected in accordance with the invention there is a substantially improved coefficient of friction with values of 5%, 4%, 3% or 2%, even at low temperature. In this context an improved coefficient of friction is to be understood to be an absolutely lower coefficient of friction µ, defined as the quotient of the horizontal force displacement hystereis area and the related rectangular area of maximum horizontal force and maximum horizontal displacement. Same is obtained in accordance with the following, diagrammatic plot of a corresponding displacement or deflection test for µ=A/(4*V*D), V being the vertical bearing load. The superelevation, also able to be recognized in this test, of the stiction force to be seen on each change in direction and to be overcome on at the beginning of motion as related to the dynamic friction amounts in the case of the materials selected in accordance with the invention typically less than 50% to 100% and more particularly merely between 10 and 25%.

In accordance with a preferred embodiment the bearing comprises a bearing plate arranged to rock at a rocking joint with the sliding shoe in relation to the latter. The rocking joint in this case defines a tilt plane which may be placed above or below the sliding plane defined by the contact between the sliding shoe and the sliding face. The rocking joint may for example be a ball joint with a spherical ball cap.

The bearing plate may be arranged above or below the sliding shoe.

Preferably the sliding bearing has a second sliding plate with a second concave sliding face, which is in contact with the sliding shoe.

In particular the sliding shoe is arranged between the first sliding plate and the second sliding plate at a sliding interface.

The sliding shoe may be arranged to slide and/or rotate in contact with the first sliding plate and the second sliding plate in relation to the second sliding plate as well. Accordingly the two sliding faces in combination deal with rotary and sliding movement of the sliding shoe.

The first sliding face and the second sliding face may possesses substantially identical curvatures. Accordingly displacements of the sliding shoe in relation to the equilibrium position are distributed to an equal degree to the two sliding faces. One advantage of this design resides in that it is possible to design without a rocking bearing to compensate for rocking movement of the sliding shoe during displacements in relation to the stable equilibrium position. As compared with the design with only one sliding face and a stationary rocking bearing the maximum displacement of the bearing is approximately doubled.

Alternatively the first sliding face and the second sliding face may exhibit different curvatures. In the case of such a design there is a different distribution of the displacement between the two mating faces.

More especially the sliding shoe is at least of a two-part design with parts connected together by a rocking joint. The use of the rocking joint means that even in the case of different curvatures of the two sliding faces relative rocking is made possible.

Preferably the first sliding face and the second sliding face will possess different sliding properties, and more particularly different coefficients of friction. This means that the overall coefficient of friction of the system may be systematically influenced and set.

The sliding shoe may, to obtain different surface pressures, have contact faces for engaging the first sliding face and the second sliding face. For example the diameters of the low friction materials consisting for example of UHMWPE or PTFE, engaging the mating face may be selected to be different. This measure as well allows an optimum setting of the overall performance of the system.

At least one of the sliding faces can have a constant curvature.

At least one of the sliding faces may be designed with a transitional arc and more particularly a clotoid, for improved centering of the sliding shoe. Owing to functional dependency of the radius of curvature from its distance from the center point of the bearing or, respectively, owing to the functional dependency of the radius of curvature from the local coordinates the return behavior of the bearing (in combination with other quantities such as friction) may be set. A clotoid in this case leads to a particularly satisfactory return behavior.

At the edge portion of the sliding face a stop may be arranged to limit the displacement of the sliding shoe in relation to the equilibrium position. This stop may for example be made in the form of a rib at the edge of the sliding plates. Accordingly it is possible to avoid the sliding shoe coming off the sliding plate in extreme situations. In the case of there being several sliding plates it is naturally possible for one or all of such sliding plates to be provided with a stop.

The bearing may furthermore have a monitoring means responsive to the condition of the bearing by measuring the thickness of the distance the low friction material stands proud of the traps in which the low friction material is held, as far as the sliding face of the respective sliding plate. In other words the size of the sliding interface between the sliding shoe and the sliding face of the corresponding sliding plate is measured at which the sliding shoe lies over the low friction material. If the sliding interface is large enough so that contact of the sliding shoe on the sliding face is reliably avoided if there is an earthquake, the bearing may be considered intact. If the condition is no longer met, the bearing must be serviced. The monitoring means can consequently provide information reliably as to whether the bearing is still serviceable with the aid of a simple measurement of the sliding interface.

In many cases furthermore a simple check by eye may suffice to provide ample information as regards the condition of the bearing. As compared with conventional structures servicing is simplified, and may be restricted to a simple visual inspection.

The sliding face can be so fashioned that the equilibrium position is an equilibrium point so that in the case of a displacement there is centering in two dimensions. More particularly for seismic protection at least one sliding face is in the form of a spherical cap with one equilibrium point. The return force accordingly acts in two dimensions, i. e. the return setting is directed to the initial position.

If for example the bearing type is employed as an alternative for a displacement sliding bearing in accordance with No. 1.5 in EN 1337-1, table 1, the sliding face can be so designed that the equilibrium position is an equilibrium line so that with a displacement there is a centering in only one dimension. The sliding face can be designed in the form of a segment of a cylindrical face with an equilibrium line parallel to the cylinder axis. The return force in the case of a displacement acts in this case athwart the longitudinal axis of the cylinder, whereas along the axis compensatory movement are rendered possible without a return moment. The bearing can be termed a single axis sliding pendulum bearing. In principle in the case of a conventional displacement sliding bearing the return in one dimension is effected by elastic displacement. The elastic displacement is produced in principle in accordance with the invention by elastic rubber-like displacement. The elastic return is in the present invention replaced by the gradual cessation of the pendulum movements into the equilibrium position. In the second dimension or, respectively, direction the bearing can on the other hand slide practically unhindered in either case.

In accordance with the invention the bearing is employed for decoupling the building's ground from the building in the case of tremors and oscillations entailed by external influences, particularly earthquakes. The bearing is as a part of a seismic protection system between a building foundation and the corresponding building. Owing to the use of the low friction material in sliding bearings for seismic protection, bridge engineering and in structural engineering, a long lasting, sturdy and practically servicing-free bearing is provided, which can be integrated in very many seismic protection systems.

An alternative application of the bearing relates to a horizontal elastic bearer for parts of building structures incivil engineering. In this application the bearing takes the place of a conventional deformation bearing. More particularly for this application the above described sliding pendulum bearing with an equilibrium line is suitable so that a return moment takes effect in one direction, whereas in the other direction a relatively free sliding is possible.

Further features and advantages of the invention will become clear from the following account of specific working embodiments.

Figure 1A:
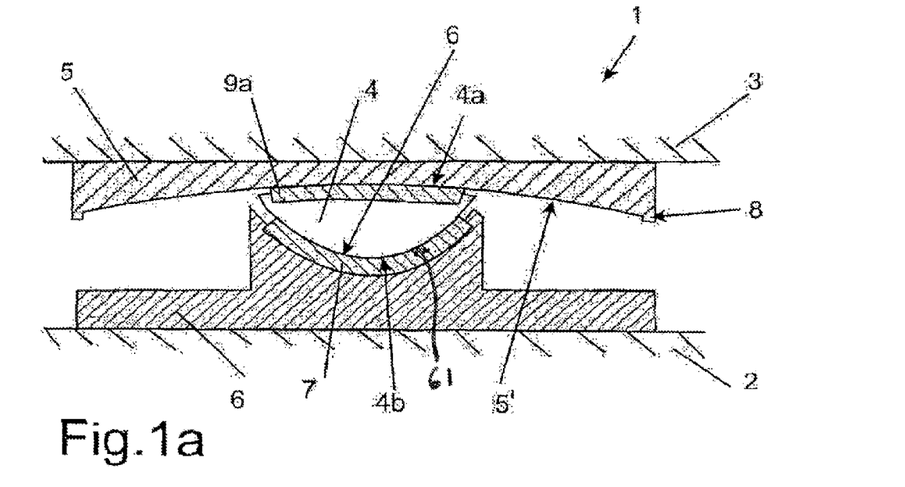
FIG. 1a shows a first working example of the sliding bearing in accordance with the invention in a equilibrium position.

In figure a sliding pendulum bearing 1 is illustrated as is for example employed for seismic protection systems in civil engineering. The bearing 1 is arranged between a building foundation 2 and a building 3 for isolation of the building 3 from the foundation 2 as regards horizontal seismic tremors.

The building 3 is connected with a top sliding plate 5 having a concave spherical sliding face 5'. The sliding face 5' of the top sliding plate 5 is for example coated with a metallic material such as hard chromium, anodized aluminum, chemical nickel or the like.

In particular the sliding plate 5 can be joined with a separate element carrying the sliding face 5' and comprises or consists of one of the said materials or consists of same. As a separate element sheet metal as for example polished stainless steel sheet comes into question.

In the case of one particular embodiment of the invention the separate element is not a part of the sliding plate 5 or joined to it but is only placed in a suitable chamber and secured in relation to same to avoid lateral displacements along the top face of the sliding plate 5. In the case of this bearing arrangement however there is a certain degree of play to allow motion so that external forces and tremors, which are transmitted to the element and cause oscillations, can not cause any damage to the attachment.

A bottom plate 6 is joined to the building foundation 2. The bottom plate 6 has a concave, spherically shaped part having a rocking face 6'.

A sliding shoe 4 adapted to the geometry of the sliding face 5' or rocking face 6' is arranged between the sliding plate 5 and the plate 6. The sliding shoe 4 possesses a top contact face 4a, which can be a transitional arc such as a clothoid, for contact with the sliding face 5' arranged for contact with the sliding face 5' lying above the sliding shoe 4 and a bottom contact face 4b, which can be a transitional arc such as a clothoid, for contact with the rocking face 6' lying underneath the sliding shoe 4. At its bottom contact face 4b the sliding shoe 4 is convexly spherical and shaped with approximately the same radius as the corresponding spherical rocking face 6'. Accordingly the sliding shoe 4 can be rocked in relation to the plate 6.

The rocking face 6', which is in contact with the sliding shoe, is in any case fashioned of a mating material 61, which renders possible a rocking of the sliding shoe 4. In particular, as depicted in FIG. 1a, the rocking face 6' can be constituted by a first sliding element 7 entrapped in the plate 6. The first sliding element 7 can be fashioned of any suitable low friction material, as for example polytetrafluoroethylene (PTFE) or ultra high molecular weight polyethylene (UHMWPE). However it is to be stressed that this sliding element can be manufactured of other non-elastic materials provided that rocking is rendered possible.

Furthermore the sliding shoe 4 has a top sliding face 4a which makes sliding contact with the sliding face 5' of the sliding plate 5. The curvature of the contact face 4a of the sliding shoe 4 is adapted to the curvature of the sliding face 5'. The curvature of the sliding face 5' is selected to be relatively small, i. e. the radius of curvature is large as compared with the horizontal extent of the sliding plate 5. This means that the sliding plate 5 may perform essentially horizontal movements in relation to the rocking plate 6, arranged underneath the sliding shoe, in the case of external application of force, as for example caused by an earthquake. Accordingly horizontal tremors entailed by quakes in the foundation 2 in relation to the building 3 may be absorbed or compensated for, since the building 3 by and large maintains its position in the case of a horizontal displacement of the foundation 2 owing to its inertia. The lateral displacement of the sliding shoe 4 in relation to the sliding plate 5 is restricted by an external stop 8 at the outer edge of the sliding face 5'.

It is significant for the invention that the top contact face 4a of the sliding shoe is constituted by a second sliding element 9a. The second sliding element 9a is entrapped in the sliding shoe 4. The second sliding element 9a consists of a low friction material having a plastic with a low coefficient of friction having elastoplastic compensatory behavior. The low friction material possesses a suitable flow behavior, i. e. under load it is pressed to a certain extent into the sliding interface between the basic body of the sliding shoe 4 and the sliding face 5', but however only with sufficient force to ensure that the sliding face 5' does not contact the basic body of the sliding shoe 4.

As low friction materials for the second sliding element 9a materials such as polytetrafluoroethylene (PTFE), ultra high molecular weight polyethylene (UHMWPE) or materials which comprise at least one fraction of polytetrafluoroethylene (PTFE) and/or ultra high molecular weight polyethylene (UHMWPE). Particularly a sliding element 9a may be manufactured of ultra high molecular weight polyethylene (UHMWPE) by sintering. The material itself may if required be mixed with lubricants or additives. Thus the low friction material may be in the form of a porous sintered material in whose surface lubricants are incorporated. The sliding element 9a may furthermore have pockets at the contact face with the sliding face 5' to receive lubricants.

The sliding element 9a is suitable for a high vertical load. Owing to its non-rigid and instead relatively elastic properties the low friction material compensates for dents, which in conventional bearings may result from high surface pressures. Thus the yielding material may adapt itself to settlement troughs, inaccuracies in the surface structure of the sliding face 5' or irregularities in the radius of curvature of the sliding face 5'. The radius of curvature of the sliding face 5' may be optimized without having to cope with possible deformation of the sliding plate 5'. Generally inaccuracies in fitting the bearing may be more readily dealt with.

Furthermore the coefficient of friction of the low friction material 9a in accordance with the invention is lower than with conventional bearings at low outside temperatures. In addition to a high thermal stability the low friction materials are characterized by low aging rates and a high resistance to wear. UHMWPE as a low friction material accordingly ensures a long service life of the robust earthquake bearing which is relatively free of the need for servicing.

Owing to the low friction between the contact face 4a and the sliding face 5' the return behavior of the bearing is improved. This means that the oscillations of the bearing 1 die out following a seismic tremor and the sliding shoe 4 comes to rest relatively accurately in the center (i. e. in the stable equilibrium position) of the sliding plate 5. Accordingly the bearing 1 again ready for continued use without further adjustments or an operation on.

In the present embodiment of the invention the sliding plane (corresponding to the sliding face 5') is arranged above the rocking plane (corresponding to the rocking face 6'). However the man in the art will know that the plane of rocking could also be arranged above the sliding shoe and the sliding plane (corresponding to the sliding face) could be placed underneath it.

The sliding pendulum bearing illustrated in FIG. 1a is in a stable equilibrium position. This means that the potential energy of the overall system is minimum. The center of gravity of the system is located in the position which is at least locally the lowest one.

Figure 1B:
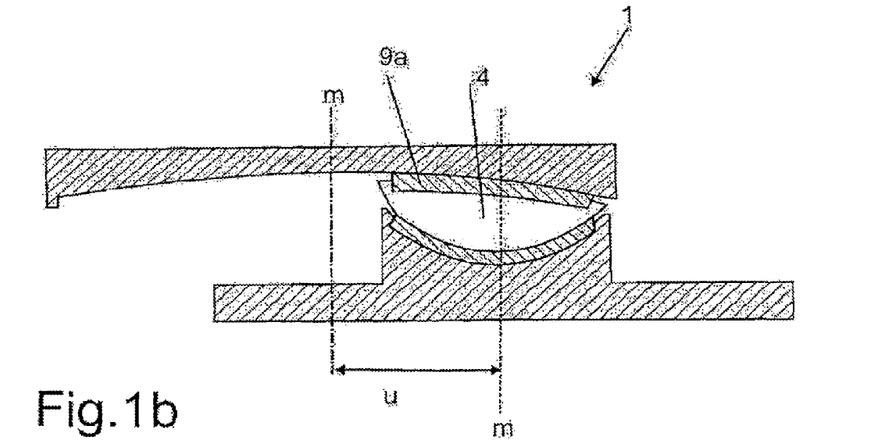
FIG. 1b shows the sliding bearing in accordance with FIG. 1a subject to a displacement caused by an earthquake.

On the other hand FIG. 1b shows a case in which the system is in a non-equilibrium position. In the case of the sliding pendulum bearing 1 the sliding shoe 4 is displaced by a distance u essentially laterally horizontally from its equilibrium position m. Owing to the curvature of the sliding face 5' from its middle point m outward the center of gravity of the sliding shoe 4 (and all components borne by it) is shifted upward. Accordingly the kinetic energy, which was introduced by the earthquake into the foundation 2, is firstly converted into potential energy. Following the tremor the sliding shoe 4 shifts back again toward the equilibrium position and its oscillations gradually die out in the following time until the energy introduced into the system by the seismic tremor has left the bearing 1.

The oscillation frequency of the system is, as in the case of pendulum, independent of the mass of the system. Accordingly an optimum design of the earthquake bearing is rendered possible. More particularly the bearing is also suitable for light buildings.

The return force is dependent on the radius of curvature of the low friction material 9a and on the sliding properties of the low friction material 9a. In accordance with the invention an elastically deforming material 9a with a low coefficient of friction is employed. This means that not only low-friction horizontal displacements of the building 3 are possible in relation to the foundation 2, but also high return forces take effect in the case of a displacement, which overcome the friction between the sliding shoe 4 and the sliding face 5' and so may return the sliding shoe back into its stable initial position.

This feature ensures that following an earthquake a displacement of the building 3 in relation to its foundation 2 is practically out of the question. Accordingly complex repair operations following an earthquake are unnecessary for a long period of time without functional impairment and without repairs being required. The servicing operations are restricted to a simple inspection by eye.

Figure 2A:
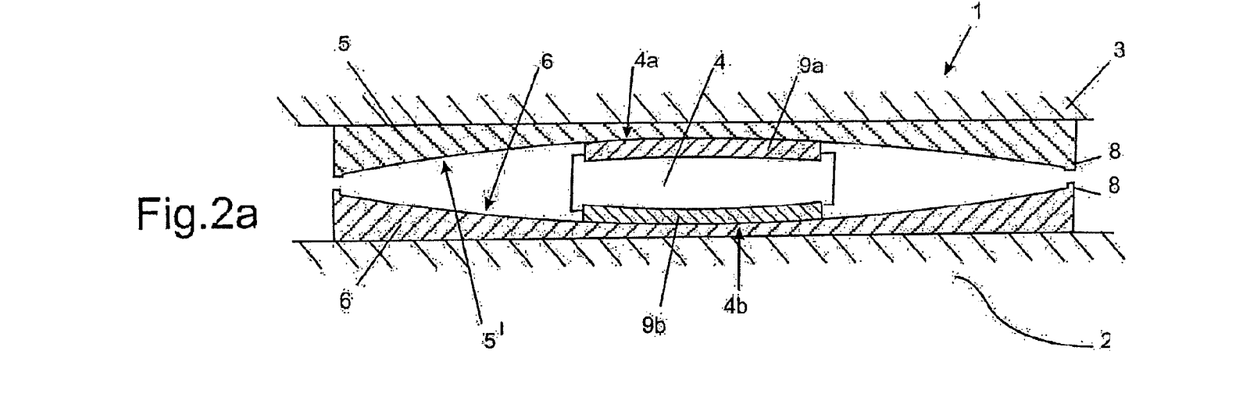
FIG. 2a shows a second embodiment of the invention as a sliding bearing in an equilibrium position.
Figure 2B:
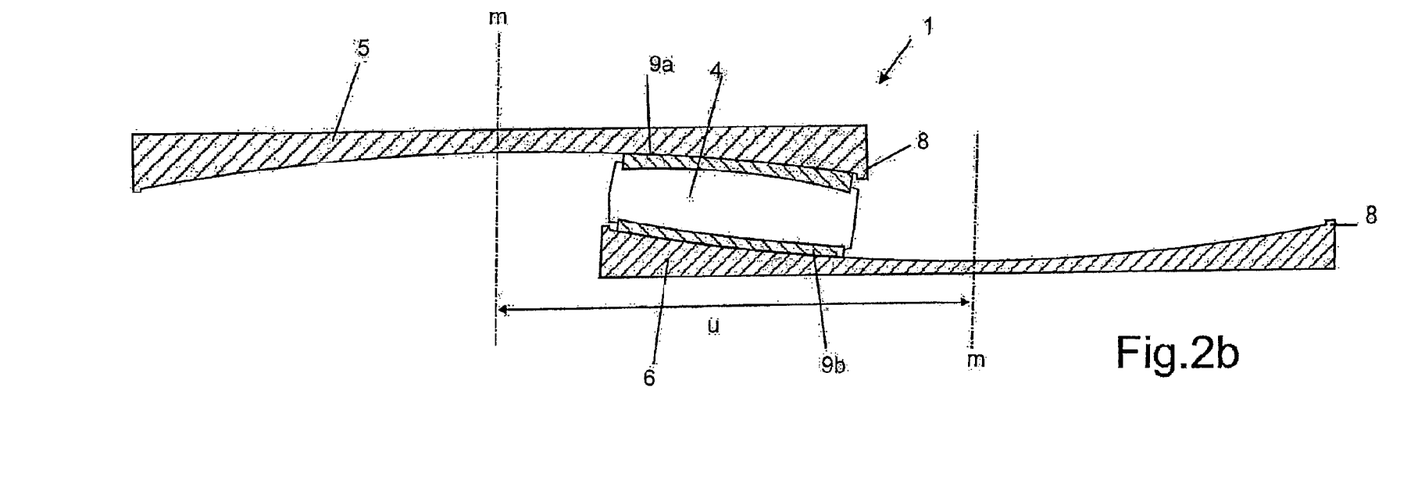
FIG. 2b shows the sliding bearing in accordance with FIG. 2a in the case of a deflection caused by an earthquake.

FIGS. 2a and 2b show a further working embodiment of the invention in the form of a sliding pendulum bearing 1 in accordance with the invention.

The bearing 1 arranged betwixt a building foundation 2 and a building 3 comprises a first sliding plate 5 with a first concave spherical sliding face 5'.

Unlike the first working example of the invention however the bearing 1 in the second embodiment instead of the plate 6 with the rocking face 6' has a second sliding plate 6 with a second sliding face 6', which is joined to the building's foundation 2. Accordingly instead of one sliding plane and one rocking plane (as in FIG. 1) there are second sliding planes 5' and 6'. The sliding faces 5' and 6' may be designed like the sliding face 5' described in connection with the sliding face 5' illustrated in FIG. 5'. The faces 5' and 6' in this working embodiment have the same radius of curvature.

A sliding shoe 4 is arranged between the sliding plate 5 and the sliding plate 6. The sliding shoe 4 has a first contact face 4a for contact with the first sliding face 5' and a second contact face 4b for contact with the second sliding face 6'

The contact faces 4a and 4b are constituted in the working embodiment by the surfaces of a first sliding element 9a and a second sliding element 9b. The sliding bodies 9a and 9b are in the form of blocks or disks. As in the working embodiment illustrated in FIG. 1a (sliding element 9a) the sliding elements 9a and 9b consist of a low friction material such as for example polytetrafluoroethylene (PTFE) or ultra high molecular weight polyethylene (UHMWPE) with an elastoplastic compensating behavior and a relatively low coefficient of friction on the mating face 5' and, respectively, 6'

The sliding elements 9a and 9b are entrapped in the top side of the basic body of the sliding shoe 4 and, respectively, in its bottom side.

As regards the material, the arrangement and the properties of the sliding elements 9a and 9b attention is called to the explanations in connection with the sliding elements 9a and FIGS. 1a and 1b. The same applies as regards the mating faces 5' and 6', which are more particularly designed like the sliding face 5' in FIG. 1a or, respectively, 1b and are correspondingly arranged. The sliding elements 9a and 9b may be identical or however different as regards the material, the size of the contact interface, the friction properties (set for example by lubricants and/or the selection of the materials) and the like.

In FIG. 2a a bearing 1 is illustrated in an equilibrium position. FIG. 2b on the other hand shows a bearing 1 deflected to a maximum extent horizontally by a tremor. The displacement is restricted by a stop 8 arranged at the outer edges of the sliding faces 5' and 6'. As clearly shown in FIG. 2b the maximum displacement u, for otherwise identical dimensions of the bearing 1, is approximately double the total displacement or deflection in FIG. 1a. The overall displacement u is distributed equally between the plates 5 and 6.

The rocking of the sliding shoe 4 is compensated for in the case of FIG. 2b because the sliding faces 5 and 6 have the same radius of curvature. Rocking of the sliding shoe 4 in relation to the first plate 5 is compensated for by a correspondingly oppositely directed rocking of the sliding shoe 4 in relation to the second plate 6.

Since in the case of a tremor the building 3 will dwell in its original position owing to inertia, there is a relative displacement between the building 3 and the foundation 2 and accordingly between the sliding faces 5 and 6. The sliding pendulum bearing 1 with the sliding bearing material of the sliding elements 9a and 9b serves to provide for a relative and generally horizontal displacement of the two components 5 and 6 relative one another. Accordingly the building structure is isolated from the ground or decoupled from it.

Following the tremor the building 3 will oscillate together with the sliding shoe 4 about the central equilibrium position m. The energy supplied to the system by the tremor is thereby converted by frictional forces into heat and removed by way of the bearing 1. Accordingly the oscillation of the sliding pendulum bearing 1 is damped. Owing to the employment of material compositions for the bearing elements 9a and 9b with elastoplastic compensatory behavior and low friction between the sliding faces 5', 6' and the sliding shoe 4 the sliding behavior (centered return) and the settlement behavior are substantially improved.

Figure 3:
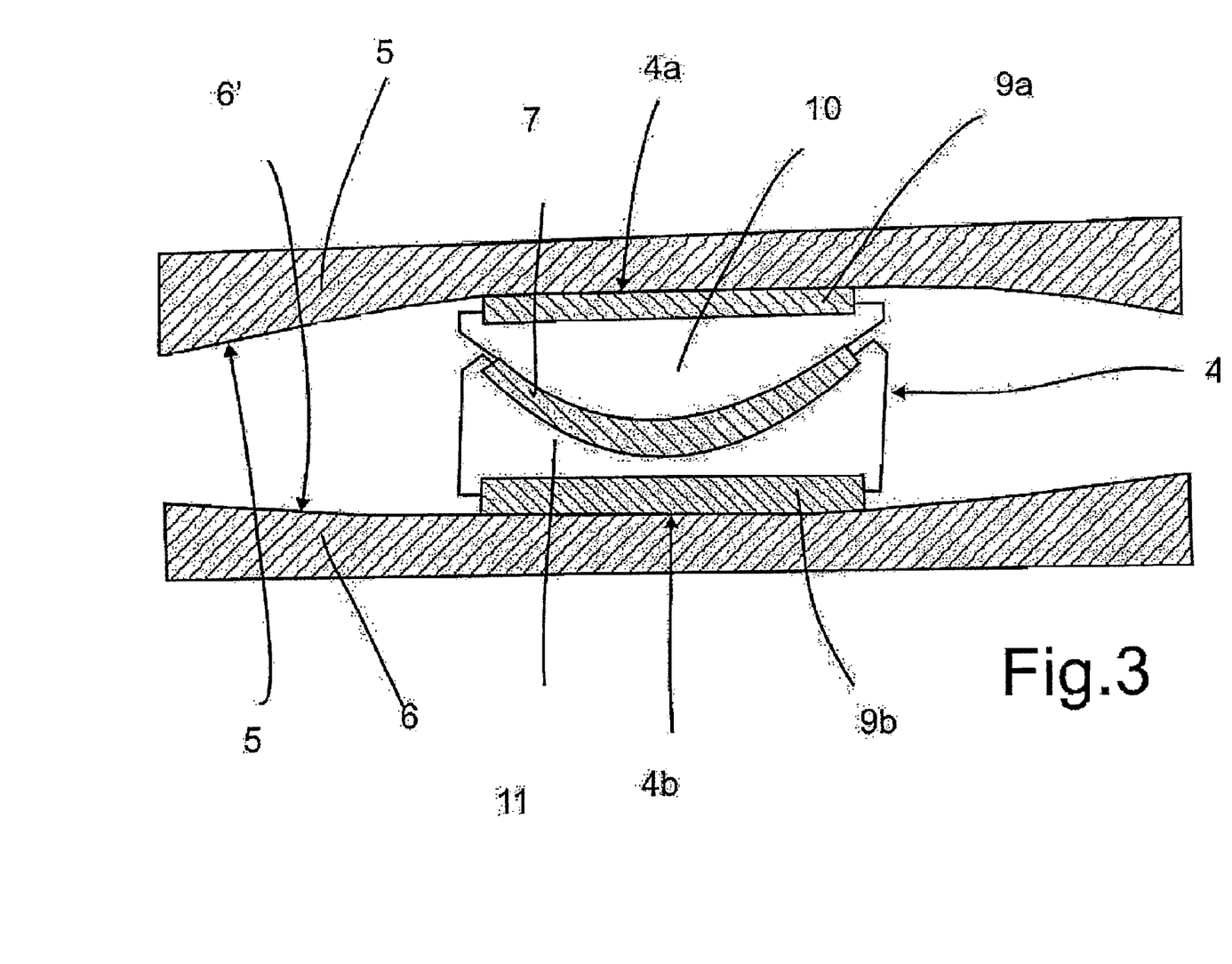
FIG. 3 shows a third embodiment of the sliding bearing in accordance with the invention in an equilibrium position.

FIG. 3 shows a combination of the working examples of FIGS. 1a and 2a.

Between two sliding plates 5 and 6 as described above a two-part sliding shoe 4 is disposed. The shoe possesses a top part 10, which is generally designed like the sliding shoe 4 in FIG. 1a. At its top contact face 4a the sliding shoe touches the first sliding face 5'. As described above the sliding face 4a of the sliding shoe 4 is constituted by a first sliding element 9a with properties described in connection with the invention.

A second part 11, disposed below the first part 10 of the sliding shoe is in contact at a second contact face 4b with a bottom sliding face 6' of the bottom sliding plate 6. The bottom contact face 4b as well is constituted by a sliding element 9b, which has the properties of the low friction material in accordance with the invention.

In the case of this working embodiment the top and bottom sliding face 5' and 6' may be designed with different radii of curvature and the bearing accordingly optimally adapted to the technical situation and requirements.

Rocking of the top sliding face 5 in relation to the bottom sliding face 6 is in this case rendered possible by having a ball joint ball-like bearing for the top part 10 of the sliding shoe 4 in relation to the bottom part 11 of the sliding shoe 4. Between the top part 10 and the bottom part 11 a low friction material 7 may be disposed, although in accordance with the invention this is not absolutely necessary. The low friction material 7 may have the same properties as the low friction material as described in conjunction with FIG. 1a.

In the case of the use of the sliding pendulum bearing as a replacement for a conventional deforming sliding bearing in accordance with the said No. 1.5 in EN 1337-1, table 1, the figures may be considered accordingly as cross sections taken through the bearing. In the longitudinal direction on the other hand the bearing 1 would be so designed that free sliding would be possible. In this case instead of an equilibrium point (as for example in the case of a sliding face in the form of a spherical cap) there is an equilibrium line. For example the sliding plate could be in the form of a concave cylindrical face with a maximum depth line. As compared with a conventional deforming sliding bearing in the case of this application as well there is an improved centering and also a more exact and more adaptable design of the bearing as regards requirements.

The invention claimed is:

1. A bearing for protection of building structures, said bearing being designed in the form of a sliding pendulum bearing comprising a sliding material, and further comprising a first sliding plate with a first concave sliding face, a second sliding plate with a second concave sliding face, and a sliding shoe that is in sliding contact with said first concave sliding face of said first sliding plate and with a second concave sliding face of said second concave sliding plate, and wherein said first sliding face has an equilibrium position for said sliding shoe that is stable in at least one dimension and into which said sliding shoe returns of its own accord following a displacement caused by external application of force, and wherein said sliding material comprises a plastic having elastoplastic compensatory properties sufficient to enable compensation of deviations of at least 0.5 millimeters from at least one of said sliding faces.

2. The bearing of claim 1, wherein said sliding material is arranged on sliding faces of said sliding shoe and on said first sliding face, which is in contact with said sliding shoe.

3. The bearing of claim 1, wherein said sliding material comprises ultra high molecular weight polyethylene (UHMWPE).

4. The bearing of claim 1, wherein said sliding material comprises polytetrafluoroethylene (PTFE).

5. The bearing of claim 1, wherein said sliding material includes lubricant components.

6. The bearing of claim 1, wherein lubricants are incorporated into at least one sliding surface of said sliding material.

7. The bearing of claim 1, wherein said sliding material and a mating material with which said sliding material is in contact have a coefficient of friction with such a relationship to a surface pressure of said sliding bearing that a product of said coefficient of friction and said surface pressure is essentially constant in a predetermined area pressure range.

8. The bearing of claim 1, wherein said sliding material and a mating material with which said sliding material is in contact have an essentially constant coefficient of friction therebetween, said coefficient being independent of speed of motion between bearing components of said sliding bearing.

9. The bearing of claim 1, further comprising a mating material with which said sliding material is in contact, said mating material comprising a metallic material with a metallic sliding layer, said metallic sliding layer being selected from the group consisting of hard chromium, anodized aluminum, chemical nickel, and nickel phosphate.

10. The bearing of claim 9, wherein said mating material and said at least one of said sliding faces has a coefficient of friction therebetween, said coefficient of friction increasing from an equilibrium-position value at said equilibrium position to an edge value at an edge of said at least one of said sliding faces.

11. The bearing of claim 9, wherein said mating material and said at least one of said sliding faces has a coefficient of friction therebetween that varies between said equilibrium position and an edge of at least one of said sliding faces.

12. The bearing of claim 1, further comprising a mating material contacted by said sliding material, said mating material comprising at least one sheet metal element.

13. The bearing of claim 12, wherein said sheet metal element is entrapped by said sliding plate.

14. The bearing of claim 12, wherein said sheet metal element lies loosely on said sliding plate.

15. The bearing of claim 1, further comprising a mating material with which said sliding material is in contact, said mating material comprising a plastic selected from the group consisting of polyamides, polyoximethylenes, polyethylene terephthalates, and polybutylene terephthalates.

16. The bearing of claim 1, wherein said bearing has a minimum coefficient of friction of at least 2%.

17. The bearing of claim 1, further comprising a bearing plate that is arranged to tilt owing to a rocking joint with said sliding shoe.

18. The bearing of claim 17, wherein said bearing plate is disposed above said sliding shoe.

19. The bearing of claim 17, wherein said bearing plate is arranged underneath said sliding shoe.

20. The bearing of claim 1, wherein said sliding shoe is arranged in one of a sliding manner and a rotatable manner in relation to both said first sliding plate and said second sliding plate.

21. The bearing of claim 1, wherein said first concave sliding face and said second concave sliding face have different sliding properties.

22. The bearing of claim 1, wherein said first sliding face and said second sliding face have the same curvatures.

23. The bearing of claim 1, wherein said first sliding face and said second sliding face have different curvatures.

24. The bearing of claim 1, wherein said sliding shoe comprises at least two parts connected by a rocking joint.

25. The bearing of claim 1, wherein said first sliding face and said second sliding face have different coefficients of friction.

26. The bearing of claim 1, wherein, to get different surface pressures, said sliding shoe has differently sized contact interfaces at said contact faces with said first sliding face and said second sliding face.

27. The bearing of claim 1, wherein said at least one of said sliding faces has a constant curvature.

28. The bearing of claim 1, wherein said at least one of said sliding faces is shaped with a clothoid for improved centering of said sliding shoe.

29. The bearing of claim 1, further comprising a stop arranged on said first sliding face for restricting displacement of said sliding shoe from said equilibrium position.

30. The bearing of claim 1, wherein said at least one of said sliding faces is shaped such that said equilibrium position is an equilibrium point, whereby following a displacement, said sliding shoe is centered in two dimensions.

31. The bearing of claim 1, wherein said at least one of said sliding faces is formed such that said equilibrium position lies along an equilibrium line, whereby following a displacement, said sliding shoe is centered in one dimension.

32. The bearing of claim 1, wherein said bearing is configured for decoupling the ground from a building in case of movements and tremors resulting from external influences.

33. The bearing of claim 1, wherein said sliding material consists essentially of ultra high molecular weight polyethylene (UHMWPE).

34. The bearing of claim 1, wherein said sliding material consists essentially of polytetrafluoroethylene (PTFE).

35. The bearing of claim 1, wherein said sliding material comprises additive components.

36. The bearing of claim 1, further comprising a mating material with which said sliding material is in contact, said mating material comprising a metallic material with a metallic sliding layer.

37. The bearing of claim 1, further comprising a mating material contacted by said sliding material, said mating material including a polished stainless steel sheet metal element.

38. The bearing of claim 1, wherein said bearing comprises a mating material with which said sliding material is in contact, said mating material including a plastic.

39. The bearing of claim 1, wherein superelevation of a stiction force associated with a change of direction of motion of said bearing amounts to less than 50%.

40. The bearing of claim 1, wherein superelevation of a stiction force associated with a change of direction of motion of said bearing has a value between 10% and 25%.

41. The bearing of claim 1, wherein a superelevation of a stiction force associated with a change of direction of motion of said bearing amounts to less than 100%.

42. The bearing of claim 1, wherein said at least one of said sliding faces is shaped with a transitional arc.

43. The bearing of claim 1, said bearing being configured to decouple the ground from a building in case of an earthquake.

44. A method of using a bearing for a single-axis support of a building structure part, said method comprising providing a bearing as recited in claim 31.

* * * * *